United States Patent Office 2,718,452
Patented Sept. 20, 1955

2,718,452

POLYTETRAFLUOROETHYLENE ORGANOSOLS AND THE FORMATION OF SHAPED ARTICLES THEREFROM

John Frank Lontz, Wilmington, Del., assignor to E. I. du Pont de Nemours and Company, Wilmington, Del., a corporation of Delaware No Drawing. Application October 29, 1953, Serial No. 389,160

19 Claims. (Cl. 18—54)

This invention relates to new organosols based on polytetrafluoroethylene and to methods for preparing and applying same. This application is a continuation-in-part of my copending U. S. patent application, S. N. 171,533, filed June 30, 1950, now forfeited.

It is well known that polytetrafluoroethylene is highly resistant to practically all solvents and is therefore highly useful as a chemically-resistant and corrosion-resistant coating and lining for various surfaces, containers, and the like. However, heretofore, no entirely satisfactory means have been available for readily applying thin continuous adherent coatings of this polymer to various surfaces from organic media.

It is, therefore, an object of this invention to provide new compositions based on polytetrafluoroethylene which will permit the application of this polymer in spinning into filaments, coating various surfaces, as well as in casting unsupported films. It is also an object of this invention to provide new and useful polytetrafluoroethylene organosols and methods for preparing same. Other objects will be apparent from the description of the invention given below.

The above objects are fulfilled by providing a fluid organosol comprising polytetrafluoroethylene dispersed colloidally in an organic liquid having a boiling point within the range of 30° to 200° C., said liquid having dissolved therein as a thickener a normally solid, substantially linear synthetic polymer which is thermally degradable and has an average molecular weight of at least 10,000. The invention is directed more specifically to compositions comprising by weight 5 to 50 parts of colloidal particles of polytetrafluoroethylene, which have been coagulated from an aqueous colloidal suspension of the polymer, 95 to 50 parts (complemental quantities, i. e. the total weight of polytetrafluoroethylene and organic liquid equals 100 parts) of an inert organic liquid having a boiling point within the range of 30° to 200° C., and 0.25 to 20 parts (0.25 to 10 parts for numerous applications) of the above thickening polymer which is thermally degradable to volatile products and is entirely dissolved in the said organic liquid. Preferably the thickening polymer is an elastomer selected from the group consisting of polymers of isobutylene, styrene, and 1,3-diolefins. More preferably the composition comprises 15 to 25 parts of colloidal polytetrafluoroethylene as a disperse solid phase, 85 to 75 parts (complementally) of a liquid hydrocarbon having a boiling point of 60° C. to 150° C. as the continuous phase, and 1 to 5 parts, per 100 parts of the said polytetrafluoroethylene-liquid hydrocarbon mixture, of an isobutylene polymer or copolymer having an average molecular weight of at least 80,000, such as polyisobutylene.

This invention also includes a preferred method of preparing the organosols by a process which comprises intimately mixing an aqueous suspension containing 5 to 50 parts of colloidal polytetrafluoroethylene with 95 to 50 parts, complementally, of the inert organic liquid, and 0.25 to 10 parts of the thickening polymer dissolved in said organic liquid, coagulating the polytetrafluoroethylene from the aqueous phase, and separating the aqueous phase from the resulting mixture and agitating the mixture thus obtained. The organic liquid which is employed as the dispersing medium is, of course, a non-solvent for polytetrafluoroethylene, which is, in fact, insoluble in all the common organic solvents, and for this reason is termed "inert."

The organosol compositions of this invention may be prepared by a variety of methods. The preferred method comprises intimately mixing the organic liquid, preferably a water-immiscible hydrocarbon, containing the dissolved thickening polymer and an aqueous suspension of colloidal polytetrafluoroethylene, followed by coagulation either by means of agitation or by the addition of an electrolyte or a water-miscible organic liquid such as acetone or alcohol. Generally, it is preferred that the aqueous suspension contain from 0.1 to 10%, based on polytetrafluoroethylene content, of a dispersing agent, many examples of which are disclosed in U. S. Patent 2,478,229.

An equally satisfactory method for obtaining the compositions involves coagulating an aqueous suspension of colloidal polytetrafluoroethylene, removing the water by filtration, drying the separated coagulated polymer, suspending the coagulated polymer in an organic liquid mutually insoluble in, or immiscible with the selected organic liquid containing the dissolved thickening polymer, adding with continuous, rapid agitation the thickened organic liquid, whereupon the coagulated polymer is preferentially taken up by the thickened organic liquid.

A third method comprises spraying a mist of the organic liquid containing the dissolved viscosity-imparting polymer onto dry particles of coagulated colloidal polytetrafluoroethylene while the particles are being tumbled in a closed, rotating blender.

A fourth method comprises mixing a slurry of the dry coagulated colloidal polytetrafluoroethylene in the organic liquid containing the dissolved thickening polymer by means of a high-speed agitator.

The organosols of this invention are mobile fluids. Pastes, dough-like materials, etc., of restricted mobility, are not included. The organosols of this invention may, in certain instances, be extended or diluted by the addition of more organic liquid. In some instances these compositions can be thixotropic, and extension with added liquid can be aided by mechanical treatment. They are, however, subjected to sedimentation on centrifugation.

The following examples illustrate specific embodiments of this invention. All parts are by weight unless otherwise specified, and all aqueous colloidal suspensions of polytetrafluoroethylene were prepared as described in U. S. Ser. No. 107,137, filed July 27, 1949, by K. L. Berry, now forfeited. The latter application discloses the polymerization of tetrafluoroethylene at 0° to 100° C. in an aqueous medium in the presence of a water-soluble polymerization catalyst such as disuccinic acid peroxide, i. e. $(HOOCCH_2CH_2OO)_2$, and an alkali metal or ammonium salt of an acid of the formula

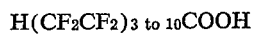
$H(CF_2CF_2)_{3 \text{ to } 10}COOH$

These acids are obtainable by oxidizing, with a permanganate oxidizing agent, a polyfluoroalkanol of the formula $H(CF_2CF_2)_{3 \text{ to } 10}CH_2OH$. The latter compounds are in turn formed by polymerization of tetrafluoroethylene in the presence of methanol and an organic peroxide catalyst at a temperature between 75° C. and 350° C., as disclosed in U. S. Serial No. 65,063, filed by R. M. Joyce on December 13, 1948, now Patent No. 2,559,628.

*Example 1.*—An aqueous colloidal suspension of polytetrafluoroethylene containing 35% polymer by weight is diluted with distilled water to give an 18% polymer suspension. Two-hundred seventy-eight parts of the latter diluted suspension (228 parts water and 50 parts polymer) containing 0.5 part of "Triton" N-100 (a polyethylene glycol ether of an alkylated phenol, which is a commercially available non-ionic dispersing agent) is mixed in a Waring Blendor with 50 parts of a commercial grade of octane hydrocarbons containing dissolved therein 2.5 parts of polyisobutylene having an average molecular weight of 120,000 ("Vistanex" B-120). This octane cut is also known as white gasoline or industrial naphtha having a distillation range which shows 14.5% off at 70° C., 54.5% off at 125° C., and 90.0% off at 180° C. After agitating at a slow speed for 30 seconds, 200 parts acetone is added during a period of 10 seconds and the entire mixture is agitated for an additional period of 30 seconds. The resulting thickened, fluid organosol is separated from the aqueous phase by straining through a filter cloth.

*Example 2.*—An organosol is prepared in the same manner as described in Example 1 from 25 parts of polytetrafluoroethylene in 139 parts of a dilute aqueous colloidal suspension of the polymer containing 0.25 part of "Triton" N-100, a solution of 3.75 parts of the same polyisobutylene dissolved in 75 parts of the same commercial cut of octane hydrocarbons, and 100 parts of acetone.

The resulting fluid gel is spread on the surface of a metal plate. On baking at 350° C., this coating forms a tough coherent film of polytetrafluoroethylene.

*Example 3.*—An aqueous colloidal suspension of polytetrafluoroethylene containing 17 parts polymer, 78 parts water and 0.17 part "Triton" N-100 is dispersed by the method of Example 1 in a Waring Blendor with a solution of 4.4 parts of the same polyisobutylene dissolved in 83 parts of the same cut of octane hydrocarbons, following which 68 parts acetone are added. After the transfer of the polytetrafluoroethylene from the aqueous phase to the organic phase is complete, the upper layer containing the organosol is decanted and centrifuged to remove occluded water. The resulting organosol retains much of the fluidity of the aqueous colloidal suspension of polytetrafluoroethylene. This organosol is useful for spraying on metal surfaces, dry spinning into a monofilament, and for dip coating onto wire.

*Example 4.*—Twenty-five parts of dried, coagulated polytetrafluoroethylene, obtained by high speed agitation of an aqueous colloidal suspension of the polymer, and a solution of 4 parts of "Vistanex" B-120 dissolved in 75 parts of industrial naphtha are mixed for 3 minutes in a Waring Blendor at high speeds. The resulting gel-like, fluid organosol is then removed by straining through a filtering cloth.

*Example 5.*—An aqueous colloidal suspension of polytetrafluoroethylene containing 17 parts polymer, 78 parts water and 0.085 part "Triton" N-100 is mixed with a solution of 4.4 parts of polystyrene having an average molecular weight of 100,000 in 83 parts of toluene with 68 parts of acetone in a Waring Blendor for 60 seconds. The resulting creamy fluid mixture is separated from the water phase by straining through filter cloth. The coagulated dispersion is redispersed with the recovered hydrocarbon layer by an additional agitation in the Waring Blendor for 3 minutes and is then suitable for use in coating and impregnating applications.

*Example 6.*—The procedure of Example 5 is repeated with the same materials, except a solution of 4.4 parts of polymethyl methacrylate having an average molecular weight of 120,000 dissolved in 83 parts of methyl isobutyl ketone is substituted for the polystyrene solution of Example 5. The resulting organosol is spread on the surface of a metal strip and then dried and baked at 350° C. to form a tough, continuous, non-porous coating of polytetrafluoroethylene.

*Example 7.*—To determine the relative porosity of films derived from granular and colloidal forms of polytetrafluoroethylene in organic media a series of comparative tests was made, with results as set forth in the following table:

*Relative porosity of films from granular and colloidal forms of polytetrafluoroethylene*

Ingredients:
25 parts polytetrafluoroethylene
71.25 parts of organic liquid
3.75 parts of thickening polymer

| Polytetra-fluoro-ethylene Form | Thickening Polymer | Organic Liquid | Film Thickness (mils) | Porosity (cc. air/min./sq. cm./mil thickness) |
|---|---|---|---|---|
| Granular* | Polystyrene | Toluene | 10 | 186.5 |
| Do* | do | do | 6 | 537.0 |
| Colloidal | do | do | 6 | 25.0 |
| Granular* | Polymethyl methacrylate | Methyl isobutyl ketone | 10 | 203.0 |
| Do* | do | do | 6 | 748.2 |
| Colloidal | do | do | 6 | 23.3 |

*Micropulverized product.

The films were prepared by spreading out the dispersions on a flat paper by means of a spatula with enough pressure, particularly with the granular preparation, to produce an even texture. After drying a few minutes the film was then stripped off and baked at 350° C. for 30 minutes. The porosity was measured by applying a stream of air at a static pressure of 1-inch of mercury through a test coil having a ½-inch circular opening in which the film is inserted. The air flow rate at approximately room temperature (25° C.) was determined by means of a wet test meter using timed intervals for measured volumes of air through-put. The porosity was then calculated as the cubic centimeters of air per minute that passed through a square centimeter of area per mil thickness. On a quantitative basis, it was evident from the above that the relative porosity of the granular polymer film was of the order 20 to 32 times greater than that of the colloidal polymer film. Furthermore, examination of the test pieces showed that the two types of films were structurally different: the granular form was opaque and tore easily with a fibrous appearance, whereas, the colloidal form was transparent and had a higher tear strength with no fibrous appearance but with practically complete interparticle fusion.

*Example 8.*—A dispersion containing 25 grams of polytetrafluoroethylene in 40 grams of water was admixed with a solution of 13 grams of polybutylene in 100 grams of "Skellysolve E" (petroleum fraction) in a Waring Blendor. To the resulting mixture was added 10 grams of aqueous 14% hydrochloric acid, and the water which separated was removed from the composition thus obtained. After removal of the water, the mixture was extruded into warm air to produce a filament which was thereafter sintered at 400° C. Upon being cold-drawn (4×), the fiber had a tenacity of 0.6 gram/denier (50% elongation), and a modulus of 2 grams/denier.

The polytetrafluoroethylene filaments, prepared in accordance with the present invention, have excellent strength, and are highly useful in numerous applications. When the filaments are spun by extrusion through a die having a diameter of 0.007 inch, followed by passage of the fiber through a heated zone at a temperature high enough to evaporate the fluid, suitably above the boiling point of the fluid medium, and passage through a sintering oven at a temperature above the 327° C. transition temperature to consolidate the polytetrafluoroethylene to maximum strength (for the undrawn fiber), filaments having strengths of, for example, 4000 to 16000 p. s. i. are produced. Filaments as hereinabove illustrated, can be drawn at room temperature to obtain filaments of higher tensile strength; in some instances, such filaments can be drawn at a draw ratio as high at 10:1.

The polytetrafluoroethylene for use in this invention may be obtained by coagulating an aqueous colloidal suspension of the polymer. Other finely-divided forms of polytetrafluoroethylene, such as the granular form obtained by direct polymerization in accordance with U. S. Patents 2,230,654, 2,393,967, and 2,394,243, the micropulverized form, or any other form which has been mechanically subdivided from the massive polymer cannot be used to form the organosols of this invention. The process of preparing the aqueous suspension of the polymer is not the subject of this invention. However, suitable aqueous suspensions may be obtained by the methods described in U. S. Ser. No. 713,385, filed November 30, 1946, by M. M. Renfrew, now Patent No. 2,534,058; U. S. Ser. No. 107,137, filed July 27, 1949, by K. L. Berry; and U. S. Patent 2,478,229. The particle size of the polymer appears to be somewhat critical; i. e., the particles should be of colloidal size before coagulation, and the smaller the particles the more satisfactory are the organosols. The particle size of the polymer in the suspensions described in the above-mentioned applications and patent in general ranges from 0.05 to 5 microns, which is the diameter of the average particle determined by an electron microscope measurement on a dried film obtained by depositing a highly diluted aqueous suspension of polytetrafluoroethylene on a surface. These colloidal suspensions have been found quite suitable for coagulation in preparing the organosols of this invention. After coagulation of the aqueous suspension, the particles of polytetrafluoroethylene may tend to agglomerate somewhat, but this does not prevent the polytetrafluoroethylene from dispersing in organic liquids containing the thickening polymer to yield organosols.

The preferred organic liquids are the hydrocarbons having a boiling point of 60° C. to 150° C. at atmospheric pressure. The lower boiling hydrocarbons are preferred since they provide an organosol from which the liquid hydrocarbon may be rapidly evaporated. The liquid hydrocarbon may be aliphatic, cycloaliphatic, or aromatic, and may be either saturated or unsaturated, although the preferred hydrocrbons are the saturated aliphatic hydrocarbons. Examples of specific hydrocarbons which are suitable include hexane, heptane, octane, nonane, decane, diisobutylenes, heptene, octene, cyclohexane, benzene, toluene, xylenes, mesitylene, hemimellitene, ethylbenzene, propylbenzne, terpenes, and commercial mixtures of various hydrocarbons, such as mixtures of aliphatic and aromatic hydrocarbons, and mixtures of saturated and unsaturated hydrocarbons.

The organic liquid is not limited to the preferred hydrocarbons, since any suitable inert organic liquid or mixture of liquids having a boiling point less than 200° C. at atmospheric pressure is suitable for use in the present invention. In some cases commercial mixtures of impure organic liquids may contain small fractions boiling close to or slightly above 200° C., but the major portion should boil well below 200° C., and in general the boiling point will be from 30° C. to 200° C. The choice of liquids other than the preferred hydrocarbons depends on the choice of thickening polymer as well as the volatility and evaporation rate desired in the final organosol composition. Suitable liquids include ketones, esters, and ethers, specific examples of which are methyl isobutyl ketone, mesityl oxide, amyl acetate, n-butyl acetate, and n-butyl lactate.

The amount of organic liquid in the organosol must be sufficient to provide a liquid composition which can be readily used for coating by spraying, dipping, and other conventional methods. On the other hand, there must be sufficient polytetrafluoroethylene in the organosol to provide thick enough coats in one application, where desired. Hence, the amount of organic liquid in the organosol may vary between 95 and 50 parts by weight and the amount of coagulated colloidal polytetrafluoroethylene may vary from 5 to 50 parts by weight, provided that the sum of the two weights is 100 parts. The preferred ranges are 85 to 75 parts organic liquid, preferably hydrocarbon, and 15 to 25 parts polytetrafluoroethylene.

The role of the viscosity-imparting polymer (i. e. thickening polymer) in the organosol is important for two reasons. First, it acts as a thickener for the organic liquid, thereby facilitating the application of the composition to surfaces by conventional methods. The thickener also prevents excessive agglomeration of the colloidal polytetrafluoroethylene particles during the coagulation step in transferring the polytetrafluoroethylene from the aqueous phase to the organic phase in the preparation of the organosol. Secondly, the polymer is important in coating, casting, and spinning applications in that it serves to bind the polytetrafluoroethylene sol after the organic liquid has been removed from the polytetrafluoroethylene article, whereby, upon subsequent sintering, high quality polytetrafluoroethylene films, fibers, etc., are formed. This second function of the thickening polymer is quite critical, especially in casting thin films and in providing thin coatings of reproducible thickness and low vapor permeability. In this respect a greater problem was encountered when it was attempted to prepare satisfactory thin coatings and cast films from a mixture of finely divided comminuted or micropulverized polytetrafluoroethylene (i. e., not polymer of colloidal size such as is obtained by coagulation of an aqueous colloidal suspension) dispersed in an organic liquid medius containing a dissolved polymeric thickener. These mixtures invariably yield relatively porous coatings and films which, although useful for certain applications, are completely unsatisfactory for some of the more important electrical insulating and chemical resisting applications for polytetrafluoroethylene. Hence, in order to provide satisfactory organosols in accordance with this invention, polytetrafluoroethylene particles of colloidal size, must be used and also a viscosity-imparting polymer, which is thermally degradable and which has an average molecular weight of at least 10,000, must be used. Moreover, the said viscosity-imparting polymer in the preferred compostions of this invention should preferably be completely soluble in the amount of organic liquid employed in the particular organosol composition. The proportion of the viscosity-imparting polymer may vary from 0.25 to 20 parts (0.25 to 10 parts for many applications) by weight, based on 100 parts by weight of the combined organic liquid and polytetrafluoroethylene present in the organosol. It is preferred to use an isobutylene polymer (which includes copolymers) having an average molecular weight of at least 80,000. The preferred group of viscosity-imparting polymers are elastomers (i. e. those polymers and copolymers having rubbery properties); these include polyisobutylene, isobutylene/styrene copolymers, isobutylene/diolefin copolymers (i. e., the butyl rubbers), styrene/diolefin copolymers, diolefin/acrylonitrile copolymers, and polychloroprene. Other suitable polymers which are thermally degradable to volatile products and satisfy the other requirements are polystyrene, polymethyl methacrylate, and polyvinyl acetate. These degradable thickeners are addition polymers, as distinguished from condensation polymers, or other polymers which do not behave as herein described, when heated. Polymers such as polyvinylidene compounds (polyisobutylene, polymethyl methacrylate, polybutyl methacrylate, etc.), which can be decomposed thermally into the monomers from which they are derived, suitably at 250° to 500° C., are especially useful as thickeners.

Small amounts of other materials may be incorporated in the compositions of this invention depending upon the properties desired in the finished articles fabricated from the compositions. Thus, there may be added to the compositions, either during the formation of the organosol or after the preparation of the organosol, finely divided solid fillers, pigments, dyes, lubricants, plasticizers, dispersing agents, stabilizers, and the like.

The chief advantage of this invention is that it permits the application at room temperature and slightly elevated temperatures of thin coatings of polytetrafluoroethylene as well as the casting of thin films and formation of filaments of polytetrafluoroethylene rapidly and economically. Another advantage is that the organosols may be used to impregnate porous structures such as paper, cloth, asbestos, and the like, the most important advantage being that the organosol is in a form which will not affect the water-sensitive structures such as occurs when applying an aqueous suspension of polytetrafluoroethylene. The organosols also permit the coating of iron and steel surfaces which present a corrosion problem when coating with an aqueous suspension of polytetrafluoroethylene. Coatings and films prepared from the organosols dry more rapidly than those from aqueous suspensions of polytetrafluoroethylene.

In most applications employing the organosols, the organic liquid will be removed by conventional methods leaving the polytetrafluoroethylene particles bound together by the thickening polymer. The structure is then heated to a temperature of 250° C.–500° C. until the thickening polymer is completely degraded, and the heating is continued above 327° C. until the polytetrafluoroethylene becomes sintered into smooth, coherent, continuous, non-porous films, coatings, or filaments, which possess a high degree of chemical resistance and excellent electrical insulating properties. The polymers employed as thickeners are preferably those which degrade to volatile products when heated at 250° C. to 500° C. without causing charring or discoloration or without affecting the inherently good electrical properties of the polytetrafluoroethylene; other organic thickening polymers such as cellulose derivatives have been found unsatisfactory as substitutes for the particular group of normally solid, substantially linear synthetic polymers defined herein. The elastomers which are generally degraded to monomer components upon heating to a temperature of 300° to 350° C., are preferred because they yield more flexible and more strongly-coherent coatings, filaments, and films prior to sintering the polytetrafluoroethylene. Printing with pigmented organosols for identification purposes or for decorative effects may be readily applied to bake, sintered polytetrafluoroethylene surfaces using conventional printing rolls or screens, followed by baking above 327° C. (preferably 327° to 500° C.) to fuse the pigmented application.

The most important uses for the organosol compositions include spinning filaments and casting films, dip-coating wires, spray-coating metal surfaces, impregnation of water-sensitive materials such as asbestos, and, in fact, any other coating, impregnating, casting, or spraying applications.

I claim:

1. A process for preparing a fluid organosol which comprises intimately mixing an aqueous suspension containing 5 to 50 parts by weight of colloidal polytetrafluoroethylene with 95 to 50 parts, complementally, of an inert organic liquid which is a non-solvent for the polytetrafluoroethylene, said organic liquid having dissolved therein from 0.25 to 10 parts of a normally solid, substantially linear synthetic addition polymer which is thermally degradable into volatile products at 250° to 500° C. and has an average molecular weight of at least 10,000, coagulating the polytetrafluoroethylene from the aqueous phase, separating the aqueous phase from the resulting mixture and agitating the mixture thus obtained whereby an organosol which is effective as a coating composition for applying polytetrafluoroethylene coatings to surfaces is obtained.

2. A fluid organosol comprising as a disperse solid phase from 5 to 50 parts by weight of colloidal polytetrafluoroethylene, and as a continuous phase from 95 to 50 parts, complementally, of an inert organic liquid which is a non-solvent for the said polytetrafluoroethylene, per 100 parts of said organosol, said liquid having a boiling point within the range of 30° to 200° C., said liquid having dissolved therein from 0.25 to 10 parts of a normally solid, substantially linear synthetic addition polymer which is thermally degradable into volatile products at a temperature of 250° to 500° C., the average molecular weight of the said addition polymer being at least 10,000.

3. The process which comprises extruding the composition of claim 2 in the form of a filament, evaporating said inert organic liquid therefrom, and compacting the resultant filament at a temperature sufficiently high to sinter the polytetrafluoroethylene.

4. The process which comprises forming a film of polytetrafluoroethylene by evaporation of said inert liquid from a film of the organosol defined by claim 2, and heating the resulting film until the said addition polymer has been removed by thermal degradation to volatile products.

5. A fluid organosol comprising as a disperse solid phase from 15 to 25 parts by weight of colloidal particles of polytetrafluoroethylene and as a continuous phase from 85 to 75 parts, complementally, of an inert organic liquid which is a non-solvent for the said polytetrafluoroethylene, said liquid having a boiling point in the range of 60° to 150° C., said liquid having dissolved therein from 1 to 5 parts of an isobutylene polymer, the average molecular weight of the said isobutylene polymer being at least 80,000.

6. The composition of claim 5 in which the said organic liquid is a hydrocarbon.

7. The composition of claim 5 in which the said organic liquid is octane.

8. The composition of claim 5 in which the said organic liquid is methyl isobutyl ketone.

9. The composition of claim 5 in which the said organosol contains a dispersing agent.

10. The composition of claim 9 in which the said dispersing agent is a polyethylene glycol ether of an alkylated phenol.

11. A process for preparing a fluid organosol which comprises intimately mixing an aqueous suspension containing 15 to 25 parts by weight of colloidal polytetrafluoroethylene with 85 to 75 parts, complementally, of a volatile inert organic liquid which is a non-solvent for the polytetrafluoroethylene, said organic liquid having dissolved therein from 1 to 5 parts of a normally solid, substantially linear synthetic polymer of the class consisting of polyisobutylene, polystyrene, and polymethyl methacrylate, said synthetic polymer being one which is thermally degradable into monomer components at 250° to 500° C. and has an average molecular weight of at least 10,000, coagulating the polytetrafluoroethylene from the aqueous phase, separating the aqueous phase from the resulting mixture and agitating the mixture thus obtained whereby an organosol which is effective as a coating composition for applying polytetrafluoroethylene coatings to surfaces is obtained.

12. The process of claim 11 in which the said organic liquid is an inert hydrocarbon.

13. The process of claim 11 in which the said organic liquid is octane.

14. The process of claim 11 in which the said organic liquid is methyl isobutyl ketone.

15. The process of claim 11 in which the said aqueous suspension contains from 0.1 to 10%, based on the weight of polytetrafluoroethylene, of a dispersing agent.

16. The process of claim 15 in which the said dispersing agent is a polyethylene glycol ether of an alkylated phenol.

17. The process of claim 15 in which the said dissolved vinylidene polymer is polyisobutylene having an average molecular weight of at least 80,000.

18. A process for preparing a fluid organosol containing colloidal polytetrafluoroethylene dispersed in an inert organic liquid having a boiling point within the range of 30° to 200° C., said liquid having dissolved therein as a thickener a normally solid, substantially linear synthetic polymer of the class consisting of polyisobutylene, polystyrene, and polymethyl methacrylate, said synthetic polymer being one which is thermally degradable at 250° to 500° C. into the monomers from which it is derived and has an average molecular weight of at least 10,000, which comprises coagulating polytetrafluoroethylene from an aqueous colloidal suspension thereof, drying the coagulated polytetrafluoroethylene, forming a slurry of the dry, coagulated polytetrafluoroethylene, in the said organic liquid containing the dissolved thickener and subjecting the resulting mixture to the action of high-speed agitation, whereby an organosol which is effective as a coating composition for applying polytetrafluoroethylene to surfaces is obtained.

19. The process of claim 18 in which the said thickener is polyisobutylene having an average molecular weight of at least 80,000.

References Cited in the file of this patent

UNITED STATES PATENTS

| | | |
|---|---|---|
| 2,393,967 | Brubaker | Feb. 5, 1946 |
| 2,413,498 | Hill | Dec. 31, 1946 |
| 2,456,255 | Coffman | Dec. 14, 1948 |